UNITED STATES PATENT OFFICE.

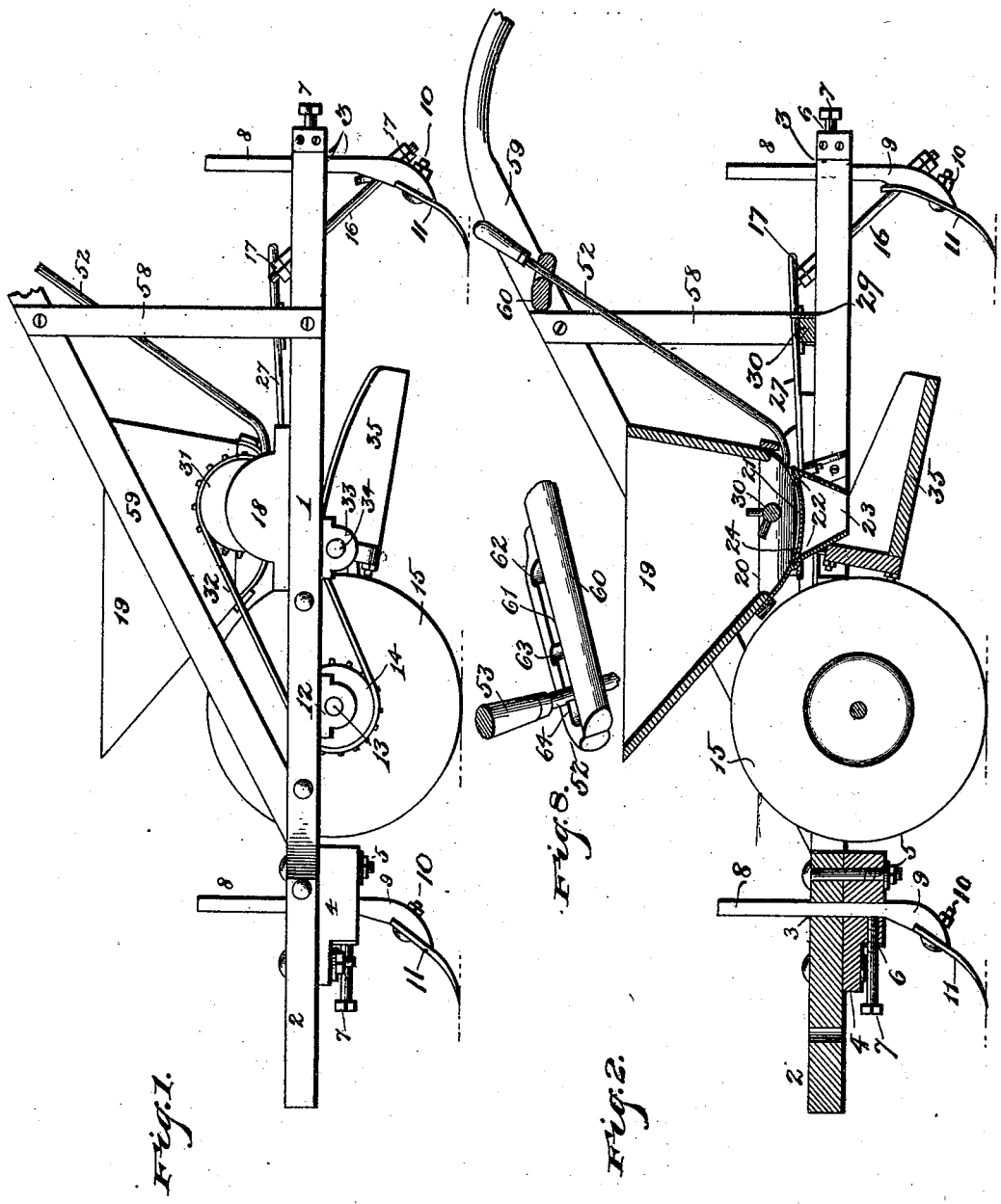

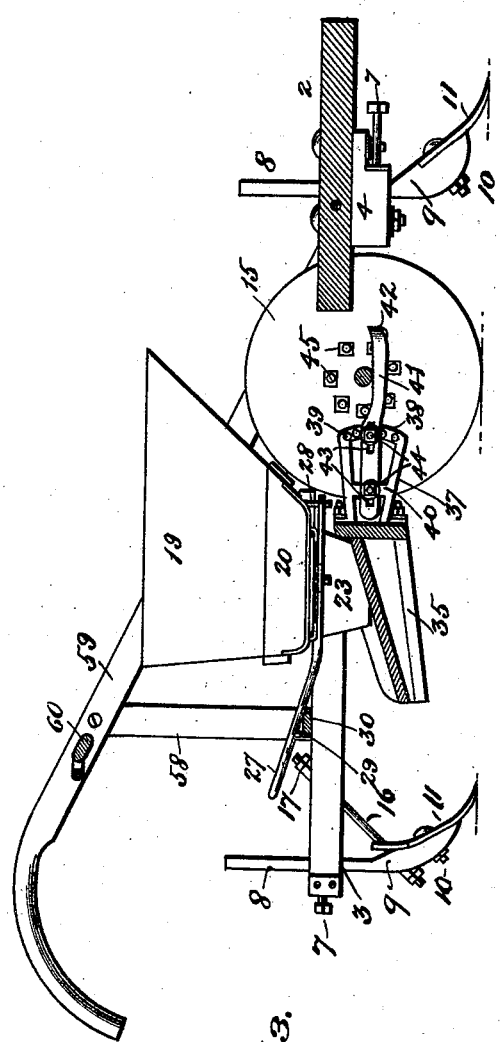

CHRISTOPHER C. TAYLOR, OF ROCKINGHAM, NORTH CAROLINA.

COMBINED PLANTER AND FERTILIZER-DISTRIBUTER.

SPECIFICATION forming part of Letters Patent No. 501,113, dated July 11, 1893.

Application filed February 8, 1893. Serial No. 461,498. (No model.)

*To all whom it may concern:*

Be it known that I, CHRISTOPHER C. TAYLOR, a citizen of the United States, residing at Rockingham, in the county of Richmond and State of North Carolina, have invented a new and useful Combined Planter and Fertilizer-Distributer, of which the following is a specification.

My invention relates to improvements in combined planters and fertilizer distributers, the objects in view being to provide a machine of this class adapted to effectually distribute fertilizing agents or plant grain, and in the operation thereof to form the furrow, drop the fertilizing agent or grain, and cover the same all in one continuous operation; to provide for a regulation of the amount of grain and fertilizing agent dropped or discharged; to provide means for throwing into and out of operation the mechanism for dropping the fertilizer or grain and for compensating for wear of the tappets which actuate the dropping-shoe.

With these various objects in view the invention consists in certain features of construction hereinafter specified and particularly pointed out in the claims.

Referring to the drawings:—Figure 1 is a side elevation of a combined fertilizer distributer and planter, the same being constructed in accordance with my invention. Fig. 2 is a vertical longitudinal sectional view of the same. Fig. 3 is a partial side elevation and longitudinal section of the machine, the view being taken at that side of the machine opposite to that shown in Fig. 1. Fig. 4 is a transverse vertical sectional view of the machine looking toward the rear. Fig. 5 is a detail in perspective of the cut-off and its operating lever. Fig. 6 is a similar view of the shoe shifting-lever for throwing the shoe into and out of operative position and for compensating for the wear of the tappets that actuate the shoe. Fig. 7 is a detail in perspective of a drag-bar that may be employed in connection with the planter when the same is utilized for planting cotton. Fig. 8 is a detail in perspective of the adjusting-bar connecting the handles, and the lever locked thereby.

Like numerals of reference indicate like parts in all the figures of the drawings.

1—1 designates the opposite converging side-beams of the machine, the same having their front ends embracing and bolted to an extension or draft-tongue 2. The draft-tongue 2 and the side-beams 1 are provided each with an opening 3, best shown in Fig. 2, and the opening of the draft-tongue is further provided upon its under side with a block 4 secured in position by means of one or more bolts 5 which pass vertically through the tongue and through the block. The opening 3 in the draft-tongue is continued in the block, and in addition the latter is provided with a side-opening 6 having internal threads. The rear ends of the beams 1 are likewise provided with these internally threaded perforations 6, and in each of the perforations 6 there is seated a binding-screw or bolt 7. The openings 3 are occupied by the shanks 8 of as many standards 9, said standards being provided with heel-bolt openings in which heel-bolts 10 are located, the said bolts passing through shovels 11. The shovel 11 at the front of the machine is of that form adapted to produce or form the furrow, while the shovels 11 at the rear of the machine are what are termed side or covering shovels and are designed to replace the soil displaced by the front shovel and consequently cover any grain or fertilizing agent that may be dropped intermediate the two sets of shovels. Inclined braces 16 pass through perforations in the standards 9 and through the beams 1, and are secured in position by nuts 17 located at the ends of the braces. In bearings 12 with which the under sides of the beams 1 are provided, there is loosely journaled an axle 13, said axle being provided with a tight or fast sprocket-wheel 14 and with a ground-wheel 15.

Supported between a pair of opposite bearings 18 and between the beams 1 is a superimposed hopper 19, the same being provided with a concaved bottom 20. The bottom is provided with a transverse discharge-opening 21, and at each side of the same with transverse ways 22, best shown in Figs. 2 and 3 of the drawings. Below the ways a discharge spout 23 is located. Within the ways 22 a transversely reciprocal seed-slide or cut-off 24 is mounted, and the same has depending from its underside a stud 25 which rides loosely in a slot 26 formed in a lever 27 (see Fig. 5).

The lever 27 is, by means of a stud 28 pivoted for horizontal movement to the under side of the hopper, and its rear end moves over a rack-bar 29, which rises above and is secured to a transverse-bar 30, which serves to connect the beams 1 in rear of the hopper. The lever 27 is designed to engage with any one of the spaces between the teeth of the rack-bar 29, and may thus be locked in any adjusted position. The lever is within easy grasp of the operator following the machine and may be manipulated to either entirely or only partially close the discharge opening 21 in the bottom of the hopper, all as will be obvious.

In the bearings 18 there is journaled a transverse shaft 30, the same extending through the hopper and above the bottom thereof, and provided with the usual agitating arms. The shaft 30 is provided at one side beyond the side wall of the hopper with a sprocket-wheel 31, and said sprocket-wheel is connected with the sprocket-wheel 14 through the medium of a chain-belt 32, by which means, as will be obvious, motion is imparted from the axle 13 and its ground-wheel to the sprocket-wheel 31 and the said agitating-shaft 30.

The beams 1 have secured upon their under sides below the hopper and slightly in advance thereof bearings 83, in which is hinged or pivoted, by means of trunnions 34, located upon the opposite sides, a shoe 35. The shoe 35 has one of its trunnions provided with a vertical-pin 36, and being narrower than the distance between the bearings in which the trunnions are mounted, it and its trunnions are therefore capable of transverse movement. The front end of the shoe has bolted thereto at one side of its center a segmentally-shaped bracket 37 the same having a front curved portion 38 provided at intervals with bolt-holes 39 and with a rear cross-bar 40 also having a bolt-hole. An arm 41 having a front curved end 42, has its rear or shank portion provided with longitudinal slots 43, which slots are designed to register with the perforations in the cross-bar 40 and with any one of the perforations in the front segmentally-curved bar 38. Bolts 44 are passed through the slots 43 of the arm and through the perforations in the cross-bar 40 and a suitable one of the perforations in the segmentally-shaped bar 38. By loosening the nuts on these bolts the arm may be extended or retracted, or by moving the front bolt the shoe may be raised or lowered and the bolt and arm secured to the bracket at some other point of adjustment.

The ground-wheel at that side thereof at which the arm 41 is located is provided with an annular series of tappets or pins 45 which project from the face of said wheel and into the path of these tappets or pins extends the front end of the arm 41. Now it will be seen that by extending the arm more or less each tappet will ride over a greater or less portion of the arm in accordance with the degree of extension, so that as will be obvious, the shoe will be more or less tilted in accordance therewith and hence discharge at each vibration more or less of its contents upon the ground. By adjusting the arm within the perforations 39 the discharge or out-put of the shoe may further be adjusted in connection with the extension or retraction of the arm. It will be seen that this means of adjustment is accurate and positive as well as convenient to the operator.

A slide 46 of L-shape, (best shown in Figs. 4 and 6) is mounted for transverse movement in a slot or opening 47 formed in one of the side-beams 1, and said slide is provided at its front end with a slot 48, which engages loosely with the before-mentioned pin 36 that rises from one of the trunnions 34 of the shoe. The slide is provided with a perforation 50 near its inner end, and in this perforation engages loosely the front bent end 51 of a curved hand-lever 52, which is provided at its extremity with a handle 53. The hand-lever 52 has adjustably mounted thereon a bearing-sleeve 54, which is provided upon its under-side with a stud 54ª, (shown by dotted lines in Fig. 6,) which takes into an eye 55, formed in a bracket 56, that is secured to the inner-side of the adjacent beam 1. A binding-screw 57, passes through the sleeve and bears upon the lever 52. Standards 58, rise from the beams 1 near their rear ends and embrace and are secured to handles 59, whose front ends are bolted to the sides of the side-beams 1. These handles 59 are secured together by means of a transverse brace or connecting-rung 60, (shown in detail in Fig. 8) and said connecting rung at one edge, as indicated at 61, has formed therein a series of, in this instance, three notches 62, 63 and 64. Passing up through this slot is the lever 52, the same being sufficiently resilient to press against the rear edge of the slot and hence to readily engage or interlock with any one of the aforesaid notches 62, 63 or 64. It will be obvious that in order to engage the lever with these notches said lever must be oscillated and by so doing its forward end engaging the slide 40 will serve to laterally move the shoe, thus throwing the arm 41 of the same into or out of alignment with the tappets or pins 45. By placing the lever in the inner notch 62, the arm 41 of the shoe is withdrawn from the path of the tappets, and hence said tappets do not serve to operate the shoe. This is done when the machine has reached the end of a row or field and it is desired to return, or when transporting the machine to or from the field. By swinging the lever so as to be engaged by the central notch the arm 41 will be moved into the path of the tappets which thus successively operate upon said arm and serve to vibrate the shoe, which at each vibration discharges its contents more or less upon the ground. In time the tappets become worn and it becomes necessary in order to effect an operative position of the shoe to swing the lever into the outer notch, which thus moves the operating-arm of the shoe closer to the wheel and hence into the path of those portions of the tappets which are not worn, and in this manner the length of utility of the device is increased.

In Fig. 7 I have illustrated a drag-device which consists of a pair of opposite standards 65, which corresponds in distance apart and in form somewhat with the shanks of the rear shovel-standards, and are adapted to be inserted in lieu of the same into the openings 3 in the rear ends of the beams. These standards 65 are secured at their lower ends to the opposite ends of the intermediate drag-bar 66, whose lower edge is rounded and is adapted to ride over the loose soil and thus level off the same and cover the seed dropped. This attachment is used especially when it is desired to plant cotton seed and is held in position by the same bolts 7 as are the standards which carry the shovels.

The operation of my invention will be obvious from the foregoing description taken in connection with the accompanying drawings, and though it hardly seems necessary to repeat the same in detail, yet for the purpose of avoiding mistake I will do so: The seed or fertilizing-agent is placed in the hopper in the usual way and the cut-off closed so as to cover the discharge-opening, after which the machine may be transported to and from the field. When the point of operation has been reached the cut-off is opened to a proper degree to admit a suitable and desired discharge of the seed or fertilizing-agent which is accomplished through a manipulation of the lever 27, which latter is locked at any suitable point by means of the rack-bar 29. It will of course be understood that the arm 41 has been properly adjusted and that the lever 52 is at the inner notch 62 of the rung 60, so that the shoe is shifted to one side out of operative position during the travel of the machine to and from the field. When it is desired to operate the machine the lever 52 is swung to one side or to the outer notch, or it may be to the middle notch in accordance with the length of the tappets, and the machine started and operated in the usual way. The front shovel forms the furrow, and as the machine moves along the tappets acting upon the arm 41 vibrates the shoe so as to discharge the seed or fertilizing-agent into the furrow thus formed and immediately after the covering-shovels operate to cover the furrow thus hilling up the same. Of course if the drag-bar 66 is employed no hill will be formed, but the ground will be leveled off.

I do not limit my invention to the details herein shown and described, but hold that I may vary the same to any degree and to any extent within the skill of persons conversant with this class of machines and yet within the scope of my invention.

Having described my invention, what I claim is—

1. In a machine of the class described, the combination with the side-bars, ground-wheel having tappets, superimposed hopper, and furrow-opening and closing-devices, of a shoe loosely hung under said hopper, a segmentally-shaped bracket 37, having a front curved bar 38, provided with perforations, and a rear cross-bar having a single perforation, the arm 41 arranged adjacent to the bracket and provided with elongated slots 43, and the bolts passed through the perforations in the front and rear bars and through the slots in the arm, substantially as specified.

2. In a machine of the class described, the combination with the side-bars, ground-wheel, having tappets, superimposed hopper, and furrow-opening and closing-devices, of a shoe loosely hung under said hopper, a segmentally-shaped bracket 37, having a front curved bar 38, provided with perforations, and a rear cross-bar having a single perforation; the arm 41 arranged adjacent to the bracket and provided with perforations, and the bolts passed through the perforations in the front and rear bars and through the slots in the arm, substantially as specified.

3. In a machine of the class described, the combination with the framework, the hopper, the ground-wheel having tappets, and the furrow-opening and closing-devices, of a shoe loosely hung under the hopper, a bracket extending forward from the shoe, and an agitating-arm mounted for the vertical and longitudinal adjustment upon the bracket and adapted to engage the tappets of the wheel, substantially as specified.

4. In a machine of the class described, the combination with the framework, the superimposed hopper, the ground-wheel, journaled in the framework of bearings located under the hopper, in rear of the wheel a shoe narrower than the framework, located therein and having its trunnions at opposite sides mounted for oscillation and transverse reciprocation in the bearings, an arm extending forward from the shoe, tappets arranged on the wheel and adapted to strike the arm, and means for transversely reciprocating said shoe, substantially as specified.

5. In a machine of the class described, the combination with the opposite beams, superimposed hopper, ground-wheel and furrow-opening and closing-devices, of tappets arranged on the wheel, bearings arranged under the beams, the shoe having the opposite trunnions mounted for reciprocation in the bearings, an arm extending forward from the shoe into the path of the tappets, a lever fulcrumed between its ends upon the framework, means for locking the lever, an L-shaped plate mounted in an opening and adapted for transverse movement upon the framework, and having its front end slotted, and a pin extending upward from one of the trunnions and engaging the slot in the plate, substantially as specified.

6. In a machine of the class described, the combination with the opposite side-beams, the superimposed hopper, the ground-wheel having tappets, and the furrow-opening and closing-devices, of the bearings upon the undersides of the beams, the vibratory shoe, an arm extending forward from the shoe and engaged by the tappets, a transverse rung having a slot which receives the upper end of the lever which slot is at one edge provided with notches, a bearing bracket extending from the adjacent beam 1 and having an eye, and a sleeve mounted on the lever and provided upon its upper side with a binding-screw and upon its under side with a bearing lug engaging the eye of the bracket, substantially as specified.

In testimony that I claim the foregoing as my own I have hereto affixed my signature in the presence of two witnesses.

CHRISTOPHER C. TAYLOR.

Witnesses:
WALTER F. L. STEELE,
WM. N. EVERETT.